United States Patent
Takahashi et al.

(10) Patent No.: US 11,275,261 B2
(45) Date of Patent: Mar. 15, 2022

(54) OPTICAL MODULATOR

(71) Applicant: Nippon Telegraph and Telephone Corporation, Tokyo (JP)

(72) Inventors: Masayuki Takahashi, Musashino (JP); Ken Tsuzuki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 47 days.

(21) Appl. No.: 17/041,319

(22) PCT Filed: Mar. 19, 2019

(86) PCT No.: PCT/JP2019/011417
§ 371 (c)(1),
(2) Date: Sep. 24, 2020

(87) PCT Pub. No.: WO2019/202894
PCT Pub. Date: Oct. 24, 2019

(65) Prior Publication Data
US 2021/0018770 A1    Jan. 21, 2021

(30) Foreign Application Priority Data

Apr. 19, 2018   (JP) .............................. JP2018-080541

(51) Int. Cl.
*G02F 1/025*   (2006.01)
*G02F 1/21*    (2006.01)

(52) U.S. Cl.
CPC .............. *G02F 1/025* (2013.01); *G02F 1/212* (2021.01)

(58) Field of Classification Search
CPC ........ G02F 1/025; G02F 1/212; G02F 1/2257; G02B 6/12; G02B 6/122
See application file for complete search history.

(56) References Cited

U.S. PATENT DOCUMENTS 7,672,553 B2 *   3/2010   Gill .......................... G02F 1/025
                                                              385/40
9,229,251 B2 *   1/2016   Akiyama .............. G02F 1/2257
(Continued)

OTHER PUBLICATIONS

International Search Report and Written Opinion dated May 28, 2019, issued in PCT Application No. PCT/JP2019/011417, filed Mar. 19, 2019.
(Continued)

*Primary Examiner* — John Bedtelyon
(74) *Attorney, Agent, or Firm* — Workman Nydegger

(57) ABSTRACT

An optical modulator is provided that is capable of preventing a short circuit at a step such as an annealing step in a manufacturing process, thereby improving the manufacturing yield. The optical modulator that is a Mach-Zehnder optical modulator, includes: an input optical coupler; a pair of first and second optical waveguides in parallel guiding an input light branched into two by the input optical coupler; and an output optical coupler coupling output lights of the first and second optical waveguides, wherein the two optical waveguides have semiconductor junctions formed at boundaries between two first polarity regions and a second polarity region formed between the two first polarity regions, each forming an optical phase modulation unit, the two first polarity regions are formed outside the first and second optical waveguides, the second polarity region is formed between the first and second optical waveguides, and the second polarity region is longer in region length in an optical waveguide direction than the first polarity region.

12 Claims, 11 Drawing Sheets

(56) References Cited

U.S. PATENT DOCUMENTS

| | | | |
|---|---|---|---|
| 9,329,415 B2 * | 5/2016 | Song | H01P 11/003 |
| 9,405,137 B2 * | 8/2016 | Manouvrier | G02B 6/12 |
| 10,295,847 B1 * | 5/2019 | Tytgat | G02F 1/0121 |

OTHER PUBLICATIONS

Nan Qi et al., *Co-Design and Demonstration of a 25-GB/s Silicon-Photonic Mach-Zehnder Modulator with a CMOS-Based High-Swing Driver*, IEEE Journal of Selected Topics in Quantum Electronics, vol. 22, No. 6, Nov./Dec. 2016, pp. 3400410-3400420.

David Patel, et al., *Design, Analysis, and Transmission System Performance of a 41 GHz Silicon Photonic Modulator*, Opt. Express, vol. 23, No. 11, 2015, pp. 14263-14275.

* cited by examiner

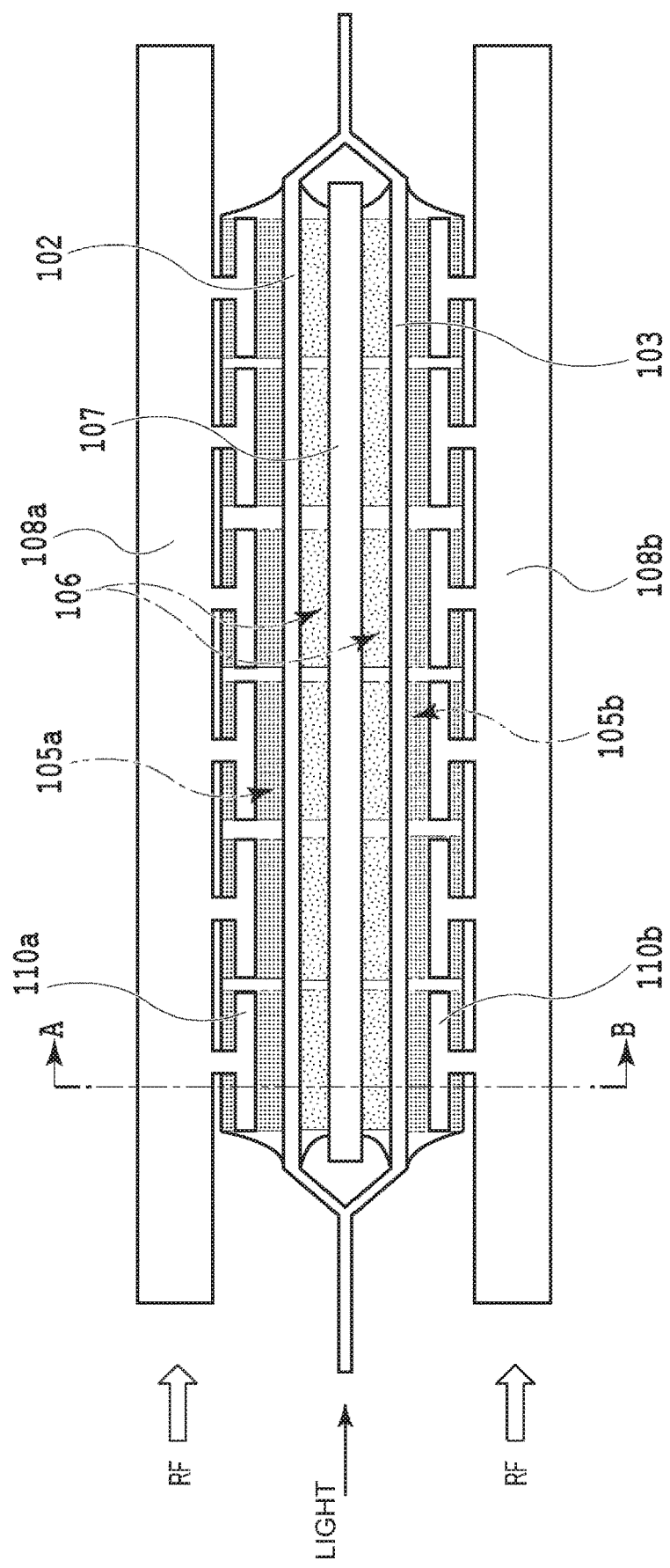

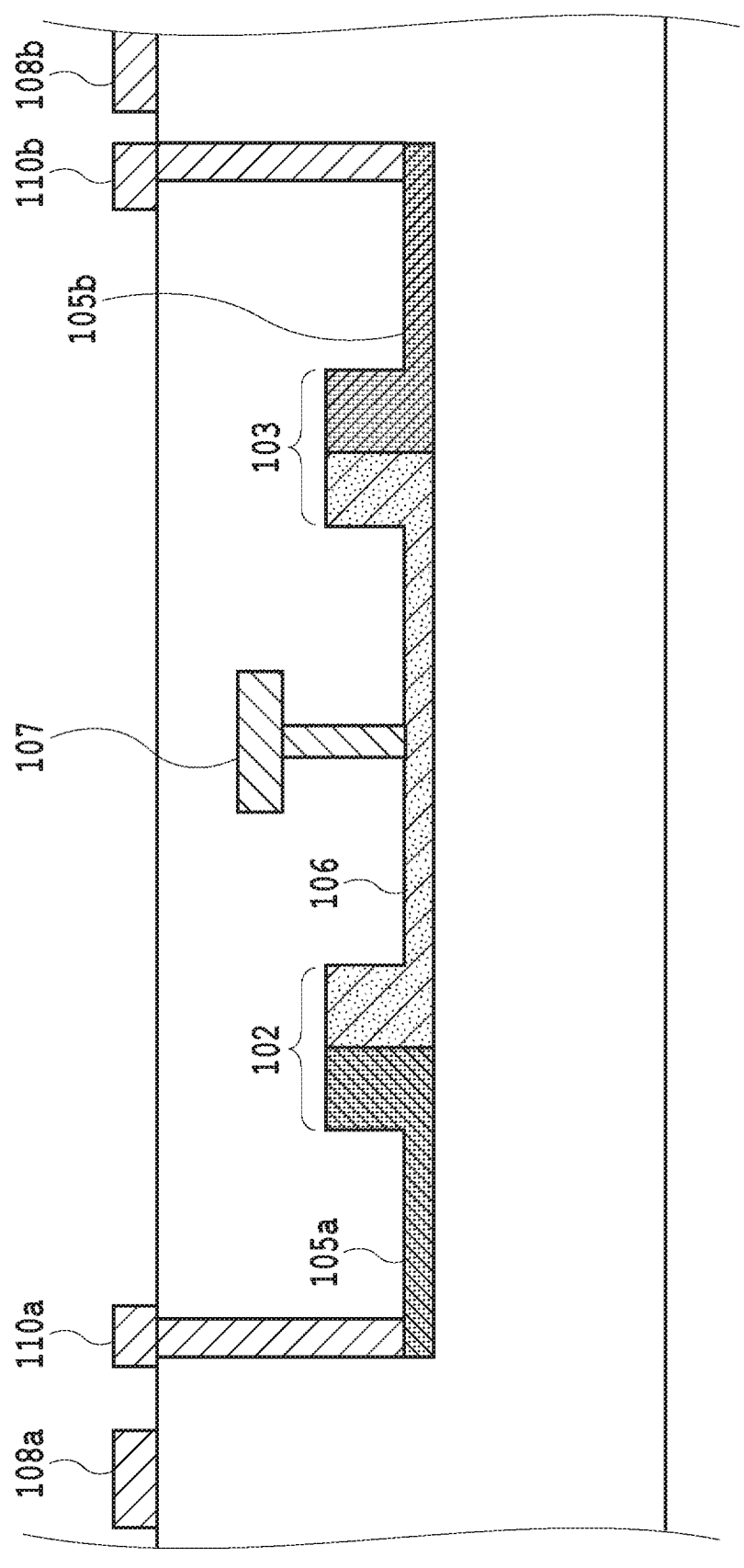

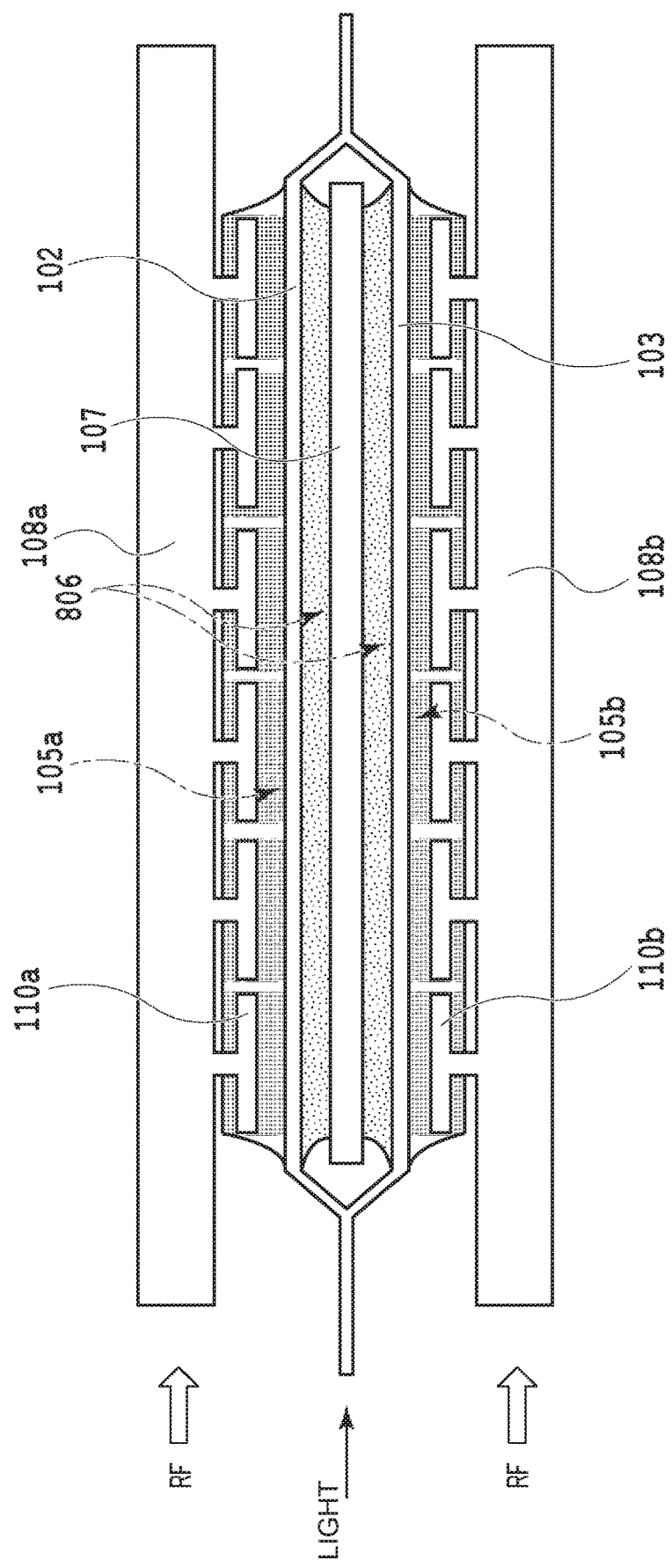

OPTICAL MODULATOR

TECHNICAL FIELD

The present invention relates to an optical modulator used in optical communication. In particular, the present invention relates to, for example, a Mach-Zehnder optical modulator which is less susceptible to a process error.

BACKGROUND ART

With the recent explosive progress of Internet-based services, there has been growing expectations for optical communication supporting this to have a larger capacity and lower power consumption. To perform optical communication, an optical modulator is required which modulates with an electric signal an optical signal to be transmitted.

A Mach-Zehnder optical modulator is configured to branch light incident on an input-side optical waveguide in two optical waveguides (arm optical waveguides) with 1:1 intensity. The branched lights are allowed to propagate over a fixed length and then multiplexed again, thereby outputting the resultant light. An optical phase modulation unit provided in each of the two branched optical waveguides (arms) is used to change the relative phase of the two branched lights, thereby changing light interference conditions when the lights are multiplexed. Thus, the output light can have a modulated intensity or phase. The Mach-Zehnder optical modulator is less dependent on wavelength, has no wavelength chirp component in principle, and is high speed, which thus has been widely used in optical communication for medium/long distance equal to or greater than a distance between metros.

The optical waveguide of the optical phase modulation unit of the Mach-Zehnder optical modulator includes a dielectric made of $LiNbO_3$ or the like or a semiconductor made of InP, GaAs, Si (silicon) or the like. A modulation electric signal is entered into an electrode disposed on each side of these optical waveguides, and a voltage is applied to the optical waveguide, thereby changing the phase of the light propagating through the optical waveguide.

In particular, an Si optical modulator using Si for the optical waveguide can collectively integrate, in addition to the Mach-Zehnder optical modulator, a photodiode using Ge (germanium) capable of crystal growth on an Si substrate, a directional coupler using an Si optical waveguide, a passive optical circuit such as a Y-splitter, and the like. This allows a device group necessary for transmission and reception in optical communication to be formed in one chip and reduced in size. Accordingly, its application to next-generation optical transmitters, optical receivers, and optical transceivers has been actively researched and developed in recent years.

The Si optical modulator includes a silicon on insulator (SOI) substrate in which an Si thin film is attached on an oxide film (BOX) layer obtained by thermal oxidization of an Si substrate surface. The Si thin film on the SOI substrate is processed into a thin wire to form an optical waveguide, and subsequently a dopant (impurity) is injected thereinto so as to change Si into a p-type or n-type semiconductor. Then, for example, $SiO_2$ is deposited to provide an optical clad layer and an electrode is formed, thereby producing the Si optical modulator. At this time, the optical waveguide needs to be designed and processed so as to reduce the optical loss. Accordingly, p-type or n-type doping and electrode formation need to be designed and processed so as to minimize the occurrence of the optical loss and the reflection and loss of a high-speed electric signal.

(Optical Waveguide of Optical Phase Modulation Unit of Si Optical Modulator)

FIG. 1 is a schematic cross-sectional view of an optical waveguide of an optical phase modulation unit having a lateral (horizontal direction) pn junction which serves as a basis of a conventional Si optical modulator. In FIG. 1, it is assumed that light propagates in a direction perpendicular to the paper. This optical phase modulation unit of the Si optical modulator includes an Si layer 2 sandwiched between $SiO_2$ clad layers 1 and 3. As shown in the cross section of the Si layer 2, an Si thin wire has a structure called a rib waveguide whose thickness is different at ribs provided on both sides of a core for the purpose of confining light. A central thickened portion of the Si layer 2 is a core 20 of the optical waveguide. The core 20 has a refractive index different from those of the peripheral $SiO_2$ clad layers 1 and 3 to confine light propagating in the direction perpendicular to the paper, thereby configuring an optical waveguide 7. On the respective both sides of the core 20, slab regions 21a and 21b are formed which have thicknesses that are thinner than that of the core 20. At respective ends of the slab regions, a high concentration p-type semiconductor layer 22 and a high concentration n-type semiconductor layer 23 are provided which have high impurity concentrations for the purpose of electrical connection.

Further, the core 20 of the optical waveguide 7 at the central portion in FIG. 1 includes a medium concentration p-type semiconductor layer 24 and a medium concentration n-type semiconductor layer 25, forming a lateral pn junction structure, to which a modulation electric signal and a bias are applied from the high concentration p-type semiconductor layer 22 and the high concentration n-type semiconductor layer 23 provided at the respective ends. The pn junction structure formed by the medium concentration p-type semiconductor layer 24 and the medium concentration n-type semiconductor layer 25 may use a pin structure semiconductor junction sandwiching an undoped i-type (intrinsic) semiconductor therebetween.

It should be noted that, in a typical semiconductor device, a region having either one of p-type and n-type semiconductor polarities can be optionally referred to as a first polarity region, and a region having the other semiconductor polarity can be referred to as a second polarity region, regardless of impurity concentration. Furthermore, the p-type and the n-type can be interchanged and used in a case where the polarity of the power supply and the bias direction of the semiconductor junction are inverted. The same applies to the following.

Although not shown in FIG. 1, metal electrodes in contact with the high concentration semiconductor layers 22 and 23 provided at the respective ends are provided at the time of operating as an optical modulator. The metal electrodes are used to apply a modulation electric signal with an RF (radio frequency) and a reverse bias electric field (an electric field from the n-type to the p-type) to a pn junction portion of the core 20. This varies the carrier density of the pn junction portion inside the core 20 of the optical waveguide and changes the refractive index of the optical waveguide (carrier plasma effect), thereby modulating the phase of light.

The dimensions of the optical waveguide depend on a refractive index of a material used for core or clad and thus cannot be determined uniquely. In one example where the rib waveguide including the core 20 and the slab regions 21a and 21b has the SOI structure as in FIG. 1, the optical waveguide has a core having a width of 400 to 600 (nm)×a height of 150 to 300 (nm) and a slab having a thickness of 50 to 200 (nm) and a length of about several millimeters (mm).

(Coupling Region of Rectangular Waveguide With Rib Waveguide)

As described above, the Si optical modulator includes the optical phase modulation unit for which the rib waveguide including the slab region is used. On the other hand, for an optical waveguide other than that of the optical phase modulation unit, a rectangular waveguide is typically used which has a simple rectangular cross section with no slab region and a lower optical propagation loss. Accordingly, forming the optical phase modulation unit of the Si optical modulator on an optical integrated circuit in which Si is used as its platform requires a region coupling the rectangular waveguide and the rib waveguide. This coupling region is provided with a mode conversion region converting a propagation mode of light, due to differences in propagation mode of light between the rectangular waveguide and the rib waveguide.

FIG. 2 includes this mode conversion region, in which FIG. 2(a) is an upper view of the coupling region of the rectangular waveguide with the rib waveguide, and FIG. 2(b) is a perspective view of the vicinity of the coupling region excluding the upper clad layer 3. As shown in FIG. 2(a), the mode conversion region is an integrated region including a pair of mode conversion regions 26a and 26b and a core portion. For such a mode conversion region, a waveguide is typically used which has a shape in which a slab region expands in a fan shape from both sides of the core 20 of the rectangular waveguide on the input side toward the slab regions 21a and 21b of the rib waveguide of the optical phase modulation unit in which the pn junction is formed. Furthermore, the mode conversion region is astride the pn junction to be reverse biased and thus adjacent thereto. Accordingly, the mode conversion region is preferred to have high resistance, for which an undoped intrinsic semiconductor is often typically used.

(Single Electrode Mach-Zehnder Optical Modulator)

To perform large-capacity optical communication, a high-speed optical modulator is required. An example of a broadband Mach-Zehnder optical modulator having a bandwidth of 10 Gbps or more is a traveling wave electrode Mach-Zehnder optical modulator. The traveling wave electrode is an electrode in which a modulation electric signal propagating through the traveling wave electrode is matched in velocity with light propagating through the optical waveguide (phase velocity matching), and thereby an electric signal is allowed to interact with light while propagating. For example, Non-Patent Literature 1 is a reported example of an Si Mach-Zehnder optical modulator using a traveling wave electrode having a length of about several millimeters.

FIG. 3 is an upper view of a single electrode Mach-Zehnder optical modulator, which is one embodiment of a conventional, typical Mach-Zehnder optical modulator using such a traveling wave electrode. Furthermore, in FIG. 4, there is shown a cross-sectional structure of a broken line portion from points A to B in FIG. 3.

An input light of the single electrode Mach-Zehnder optical modulator (a thin line arrow indicates the traveling and waveguide directions of light) is branched into two by an input optical coupler (or a Y-splitter) 101. The branched lights are individually guided to a pair of a first waveguide 102 and a second waveguide 103 in parallel via the mode conversion region 26 shown in FIG. 2 and are subjected to optical phase modulation. At the output-side mode conversion region, the lights are subjected to mode conversion in a reversed manner and then optically coupled at an output optical coupler 104, thereby outputting a modulated light. Furthermore, FIGS. 3 and 4 also show a bias electrode 107, and traveling wave electrodes 108a and 108b to which an electric modulation signal RF is applied.

The waveguides 102 and 103 forming optical phase modulation units of the optical modulator in FIG. 3 are rib waveguides each having a cross section as in FIG. 1 described above. The optical phase modulation units are divided into three semiconductor regions: first polarity regions 105a and 105b; and a second polarity region 106 sandwiched between the first polarity regions 105a and 105b. The first and second polarities of the semiconductor regions may be switched in p/n polarity. Junction surfaces of the semiconductor junctions are formed at boundaries between the two semiconductor regions having different polarities and, along the first waveguide 102 and the second waveguide 103, are positioned inside the cores, thereby each forming the optical phase modulation unit.

In FIG. 3, there is shown a case where the second polarity region 106 is formed at a region between the waveguides 102 and 103. The first polarity regions 105a and 105b are formed, with respect to the second polarity region 106, in the opposite directions using, as the axes, the light traveling directions of the respective optical phase modulation units. That is, the first polarity regions 105a and 105b are formed at regions outside the waveguides 102 and 103.

Coupling regions of the input optical coupler 101 with the first waveguide 102 and the second waveguide 103 and coupling regions of the output optical coupler 104 with the first waveguide 102 and the second waveguide 103 are each provided with the mode conversion region 26 in FIG. 2. The coupling regions are undoped to either polarity and are ideally intrinsic semiconductors.

In the cross-sectional view in FIG. 4, the bias electrode 107 made of metal is provided on the second polarity region 106, forming an intermediate structure of the upper clad layer 3. Furthermore, the traveling wave electrodes 108a and 108b are provided on the respective first polarity regions 105a and 105b, forming a surface structure of the upper clad layer 3. Each electrode is electrically connected to the corresponding Si-layer semiconductor region by a connection structure such as a via (interlayer connection electrode).

In the case of an Si optical modulator, deterioration in modulation velocity may occur if the pn junction is not in a reverse bias state. Accordingly, a bias voltage is applied to the bias electrode 107 made of metal so as to bring the pn junction into a reverse bias state, regardless of signal voltage state of each of a pair of the traveling wave electrodes 108a and 108b. Then, a differential voltage is supplied from the input side in FIG. 3 as a modulation electric signal RF and applied to the traveling wave electrodes 108a and 108b, thereby modulating light.

In summary, the Mach-Zehnder optical modulator in FIG. 3 includes: the input optical coupler 101; a pair of the first optical waveguide 102 and the second optical waveguide 103 in parallel guiding the input light branched into two by the input optical coupler; and the output optical coupler 104 coupling the output lights of the first and second optical waveguides, wherein the first optical waveguide 102 and the second optical waveguide 103 have the semiconductor junctions formed at the boundaries between the first polarity regions 105a and 105b and the second polarity region 106 formed between the first polarity regions 105a and 105b, each forming the optical phase modulation unit, the first polarity regions 105a and 105b are formed outside the first optical waveguide 102 and the second optical waveguide 103, and the second polarity region 106 is formed between the first optical waveguide 102 and the second optical waveguide 103.

(Capacity Loaded Electrode Mach-Zehnder Optical Modulator)

In FIG. 5, there is shown a capacity loaded electrode Mach-Zehnder optical modulator derived from the conventional single electrode Mach-Zehnder optical modulator (Reference 2). In FIG. 6, there is shown a cross-sectional structure of a broken line portion from points A to B in FIG. 5. In FIGS. 5 and 6, portions identical to those of FIGS. 3 and 4 are labeled with the same reference numerals, and explanations thereof are omitted.

In the capacity loaded Mach-Zehnder optical modulator in FIG. 5, the first polarity regions 105a and 105b and the second polarity region 106 that are included in the optical phase modulation units of the single electrode Mach-Zehnder optical modulator in FIG. 3 are divided into a plurality of regions along the optical waveguide direction. Each divided portion is provided with a T-shaped metal electrode as a loaded electrode 110a or 110b. The loaded electrodes 110a and 110b are bulging portions in the direction of facing each other from the traveling wave electrodes 108a and 108b.

In the capacity loaded Mach-Zehnder optical modulator, these loaded electrodes 110a and 110b function as loaded capacities, and via these loaded electrodes 110a and 110b, the first polarity regions 105a and 105b are electrically connected to the traveling wave electrodes 108a and 108b, respectively. The insertion ratio of the first polarity regions 105a and 105b and the second polarity region 106 that are divided into a plurality of regions with respect to the lengths of the optical phase modulation units (the first optical waveguide 102 and the second optical waveguide 103) in the light traveling direction is typically called a duty factor (fill factor). The larger this fill factor, the larger the capacity by the pn junction per unit length in the light traveling direction, and the smaller the electrical characteristic impedance.

In this way, the capacity loaded electrode optical modulator is advantageous in that the electrical characteristic impedance can be adjusted by a change of the fill factor. This advantageous structure achieves impedance matching with an electronic circuit driving the optical modulator, thereby improving high frequency characteristics.

CITATION LIST

Non-Patent Literature

Non-Patent Literature 1: Nan Qi, Xi Xiao, Shang Hu, Xianyao Li, Hao Li, Liyuan Liu, Zhiyong Li, Nanjian Wu, and Patrick Yin Chiang, "Co-Design and Demonstration of a 25-Gb/s Silicon-Photonic Mach-Zehnder Modulator With a CMOS-Based High-Swing Driver" IEEE JOURNAL OF SELECTED TOPICS IN QUANTUM ELECTRONICS, VOL. 22, NO. 6, pp. 3400410, 2016.

Non-Patent Literature 2: David Patel, Samir Ghosh, Mathieu Chagnon, Alireza Samani, Venkat Veerasubramanian, Mohamed Osman, and David V. Plant, "Design, analysis, and transmission system performance of a 41 GHz silicon photonic modulator" Opt. Express vol. 23, no. 11, pp. 14263-14275, 2015.

SUMMARY OF THE INVENTION

Technical Problem

In the single electrode Mach-Zehnder optical modulator in FIG. 3, the mode conversion region 26 is ideally an intrinsic semiconductor as described above. However, as shown in FIG. 7(a), the Mach-Zehnder optical modulator includes the two adjacent optical waveguides forming the optical phase modulation units, and thus the mode conversion regions 26a to 26d are also adjacent to each other, substantially forming an integrated intrinsic semiconductor region.

Such a conventional structure may cause dopants of the first polarity regions 105a and 105b to diffuse into the peripheral regions due to, for example, activation of dopants in an annealing step after a doping process or heating in a step in which a chip is mounted on a module after completion of a manufacturing process of the optical modulator. Accordingly, as shown in FIG. 7(b), the mode conversion regions 26a to 26d become semiconductor regions having dopants identical to those of the first polarity regions 105a and 105b. Thereby, conductivity is imparted between the first polarity regions 105a and 105b, and a current leakage path may be formed. For explanation of this situation, in FIG. 7(b), there is also shown distribution of semiconductor polarity of the lower bias electrode 107.

In this case, even if differential modulation signals are entered into the traveling wave electrodes 108a and 108b in FIG. 7(b), an electrical short circuit occurs between the first polarity regions 105a and 105b via the mode conversion regions 26a to 26d having the first polarities. As a result, no voltage is applied to the pn junction of the optical phase modulation unit, and no modulation is performed. Alternatively, even if the mode conversion regions 26a to 26d have low concentration first polarities instead of having obvious short circuits, voltage application is not sufficiently performed and part of the voltage is conducted as a leakage current, which may cause deterioration in modulation characteristics.

Furthermore, in the capacity loaded electrode Mach-Zehnder optical modulator in FIG. 5, the first polarity regions 105a and 105b and the second polarity region 106 that are included in the optical phase modulation units are divided into a plurality of regions in the optical waveguide direction due to an adjustment of the fill factor. However, when the region between the divided regions becomes a semiconductor region having a dopant identical to those of the first polarity regions 105a and 105b due to, for example, the similar dopant diffusion, a short circuit occurs between the divided first polarity regions 105a and between the divided first polarity regions 105b in FIG. 5. Thus, similarly, no modulation may be performed or the modulation characteristics may be deteriorated.

The present invention has been made in view of such problems, and an object thereof is to realize an optical modulator that is capable of, with its doping region structure, preventing each of a pair of first polarity regions of the optical modulator from having a short circuit at a step such as an annealing step in a manufacturing process, thereby improving the manufacturing yield.

Means for Solving the Problem

To solve such problems, the present invention has the following configurations.

(Configuration 1 of Invention)

An optical modulator that is a Mach-Zehnder optical modulator, including: an input optical coupler; a pair of first and second optical waveguides in parallel guiding an input light branched into two by the input optical coupler; and an output optical coupler coupling output lights of the first and second optical waveguides, wherein the first and second optical waveguides have semiconductor junctions formed at boundaries between two first polarity regions and a second polarity region formed between the two first polarity regions, each forming an optical phase modulation unit, the two first polarity regions are formed outside the first and second optical waveguides, the second polarity region is formed between the first and second optical waveguides, and the second polarity region is longer in region length in an optical waveguide direction than the first polarity region.

(Configuration 2 of Invention)

The optical modulator according to Configuration 1 of the invention, wherein the first polarity region is divided into a plurality of regions each along the optical waveguide direction.

(Configuration 3 of Invention)

The optical modulator according to Configuration 1 or 2 of the invention, wherein the second polarity region includes a plurality of partial regions having an identical second polarity and having different impurity concentrations in a direction perpendicular to the optical waveguide direction.

(Configuration 4 of Invention)

The optical modulator according to Configuration 3 of the invention, wherein of the partial regions, only a partial region having the highest impurity concentration is formed without being divided into a plurality of regions along the optical waveguide direction, is disposed at a position distant from a light confining region of the optical waveguide, and is formed so as to be longer in region length in the optical waveguide direction than other partial regions.

(Configuration 5 of Invention)

The optical modulator according to any one of Configurations 1 to 4 of the invention, wherein the first and second optical waveguides are rib waveguides, coupling regions of the input optical coupler with the first and second optical waveguides and coupling regions of the output optical coupler with the first and second optical waveguides are each provided with a mode conversion region, and the mode conversion region has a shape in which a slab region expands in a fan shape toward a slab region of the rib waveguide.

(Configuration 6 of Invention)

The optical modulator according to Configuration 5 of the invention, wherein the second polarity region completely covers, in the mode conversion region, a portion corresponding to an inside of a semiconductor junction surface of each of the two optical waveguides.

(Configuration 7 of Invention)

The optical modulator according to Configuration 5 of the invention, wherein the second polarity region does not reach the mode conversion region but is longer than the first polarity region.

(Configuration 8 of Invention)

The optical modulator according to Configuration 5 of the invention, wherein the second polarity region blocks, in the mode conversion region, an intrinsic semiconductor region over whole of the mode conversion region in the optical waveguide direction with at least part of a core width of a core of the optical waveguide.

Effects of the Invention

As described above, according to the present invention, it is possible to, with its doping region structure, prevent each of a pair of the first polarity regions of the optical modulator from having a short circuit at a step such as an annealing step in a manufacturing process, thereby improving the manufacturing yield of the optical modulator.

BRIEF DESCRIPTION OF DRAWINGS

FIG. 5 is an upper view of a conventional capacity loaded Mach-Zehnder optical modulator.

FIG. 6 is a cross-sectional view of the conventional capacity loaded Mach-Zehnder optical modulator.

FIG. 10 is an upper view of a capacity loaded Mach-Zehnder optical modulator according to Embodiment 2 of the present invention.

DESCRIPTION OF EMBODIMENTS

Hereinafter, an embodiment of the present invention will be explained in detail in reference to the drawings.

Embodiment 1

Figure 1:
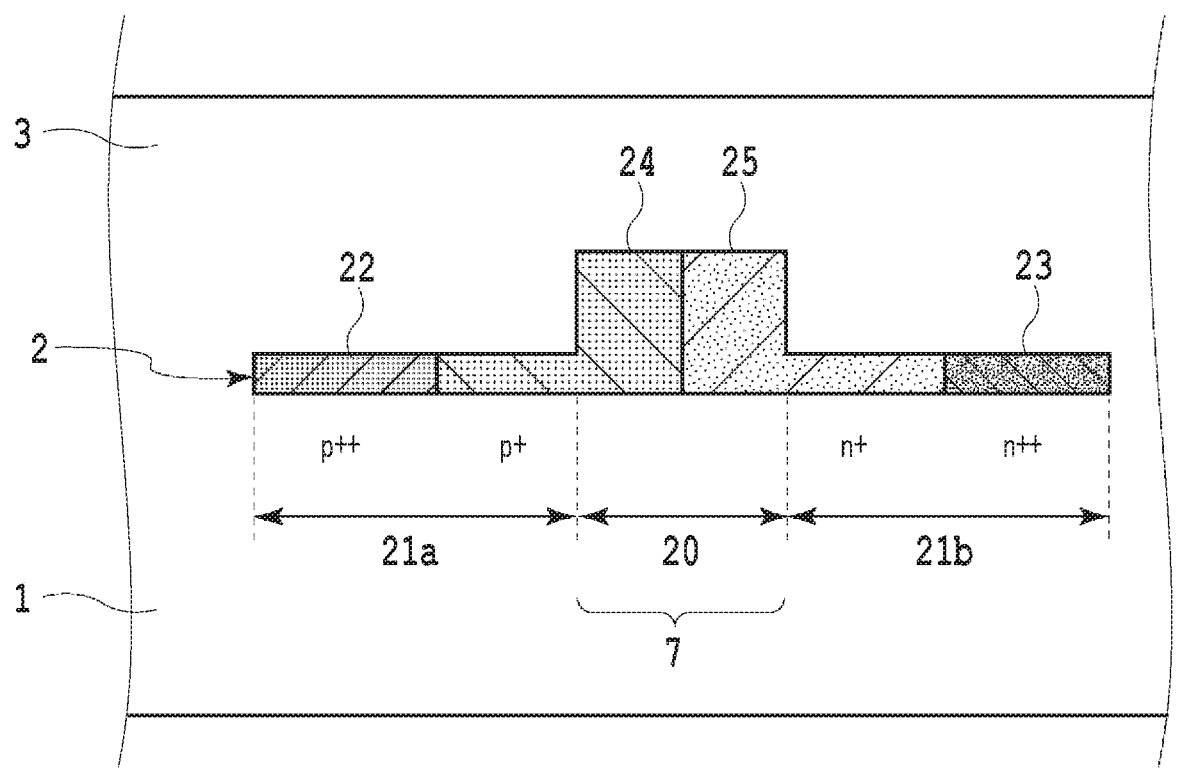
FIG. 1 is a cross-sectional view of an optical waveguide of an optical phase modulation unit of a conventional Si optical modulator.
Figure 2A:
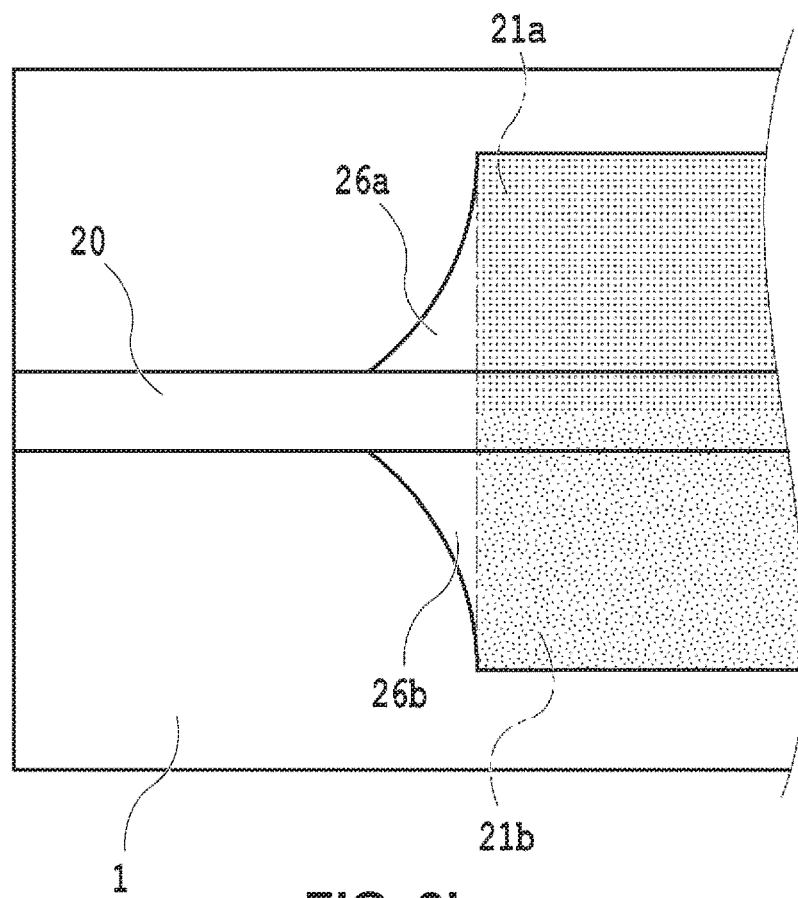
FIG. 2(*a*) is an upper view of a conventional coupling region of a rectangular waveguide with a rib waveguide, and FIG. 2(*b*) is a perspective view thereof.
Figure 2B:
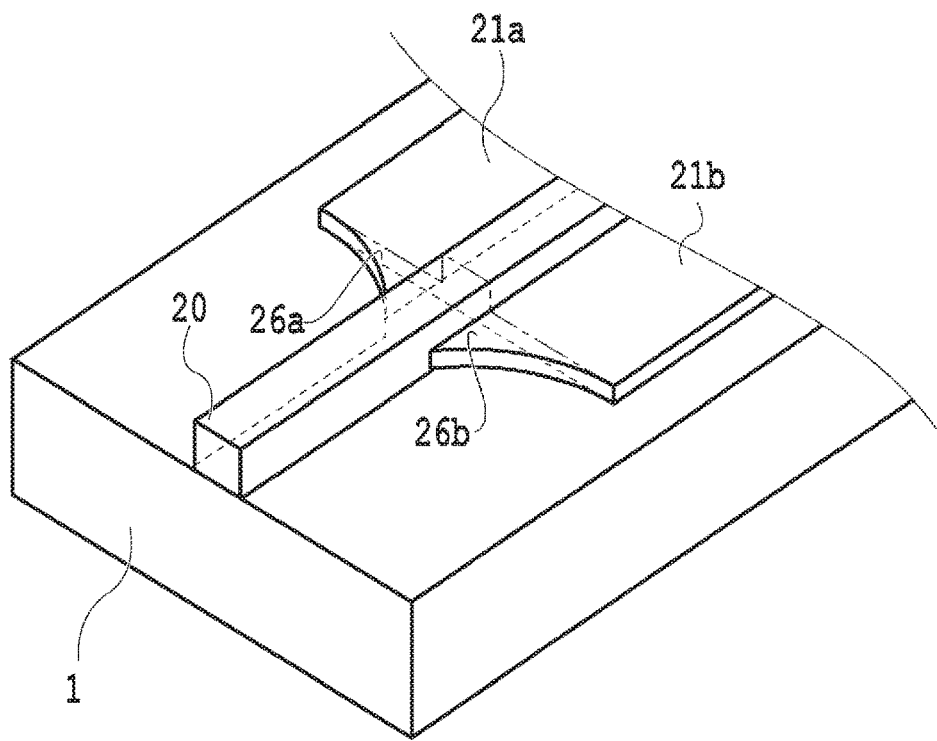
Figure 3:
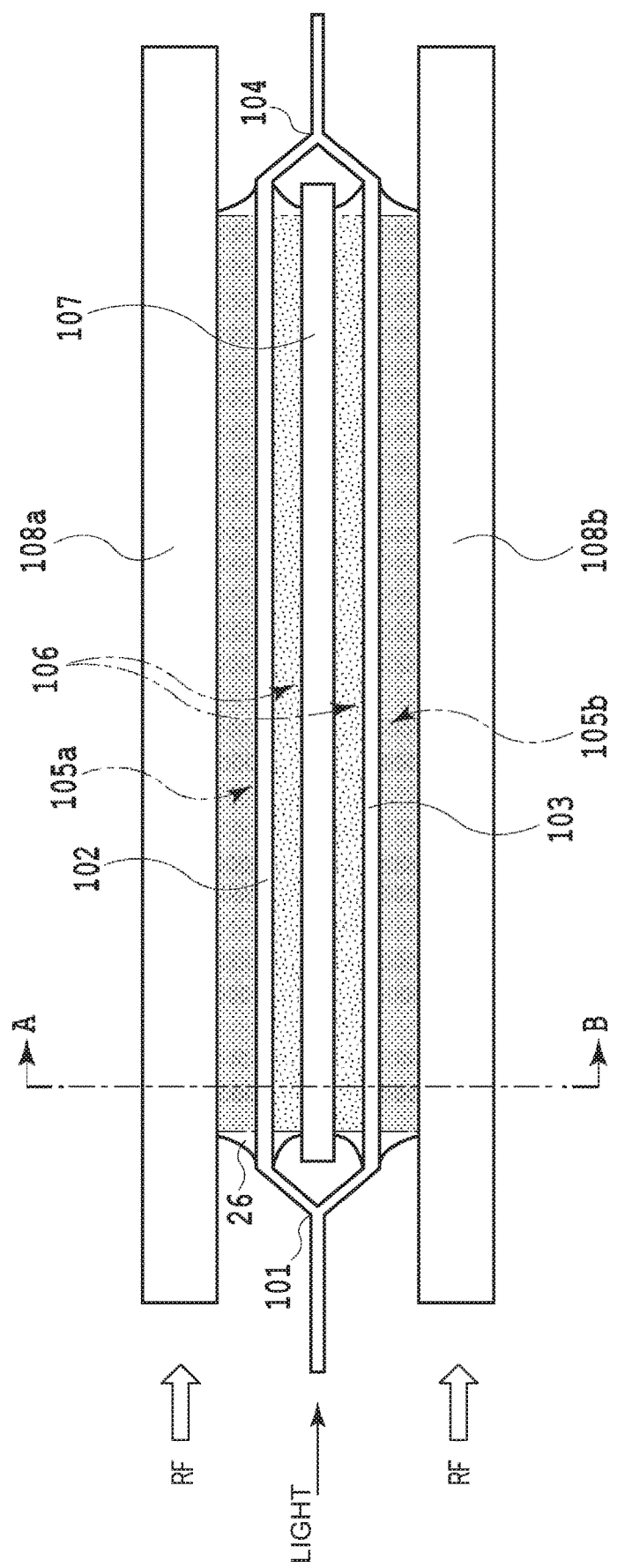
FIG. 3 is an upper view of a conventional single electrode Mach-Zehnder optical modulator.
Figure 4:
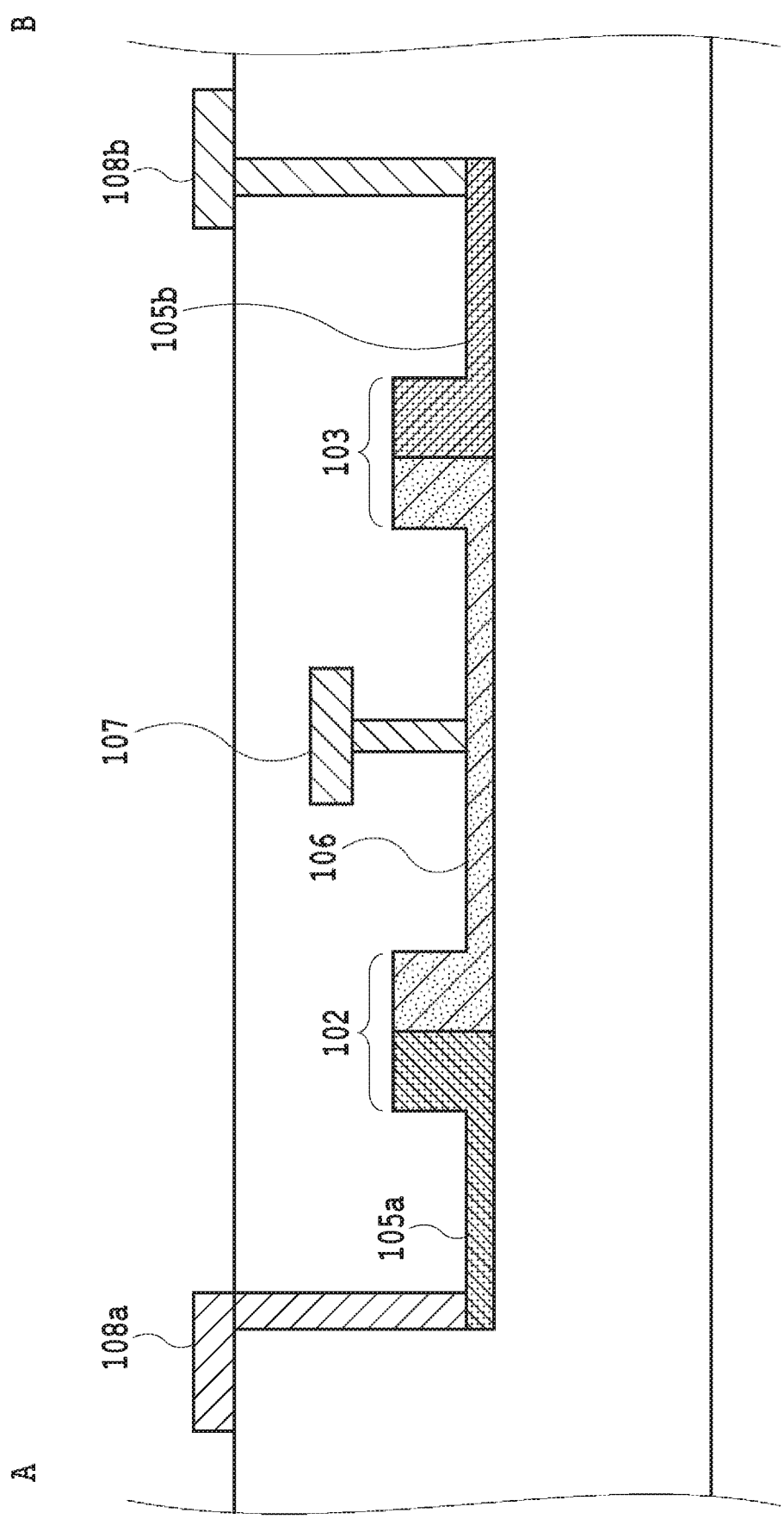
FIG. 4 is a cross-sectional view of the conventional single electrode Mach-Zehnder optical modulator.
Figure 7A:
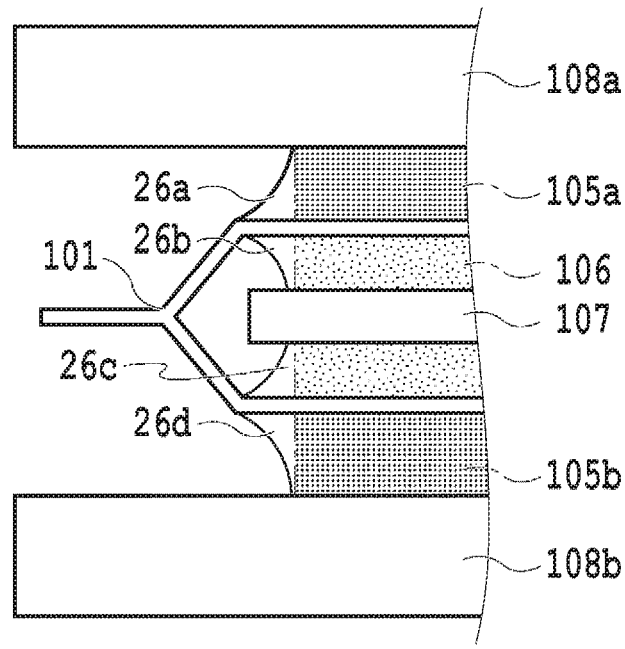
FIGS. 7(*a*) and 7(*b*) are upper views explaining problems of coupling regions of the conventional single electrode Mach-Zehnder optical modulator.
Figure 7B:
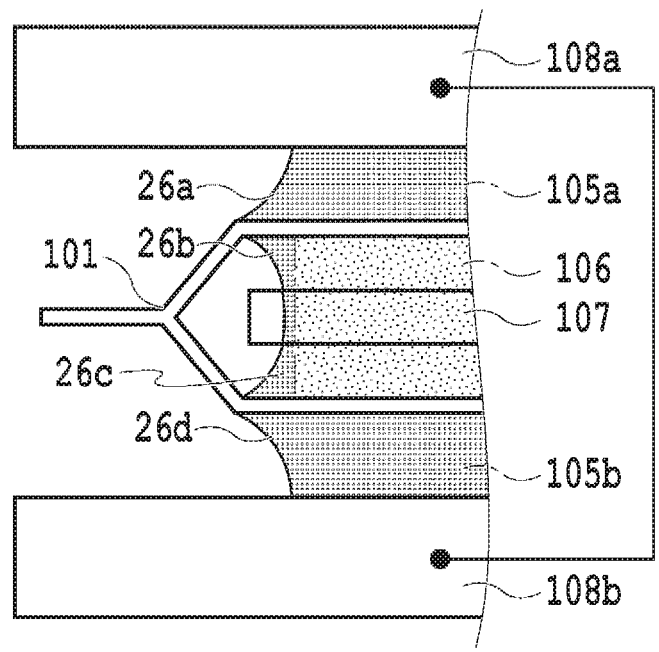
Figure 8:
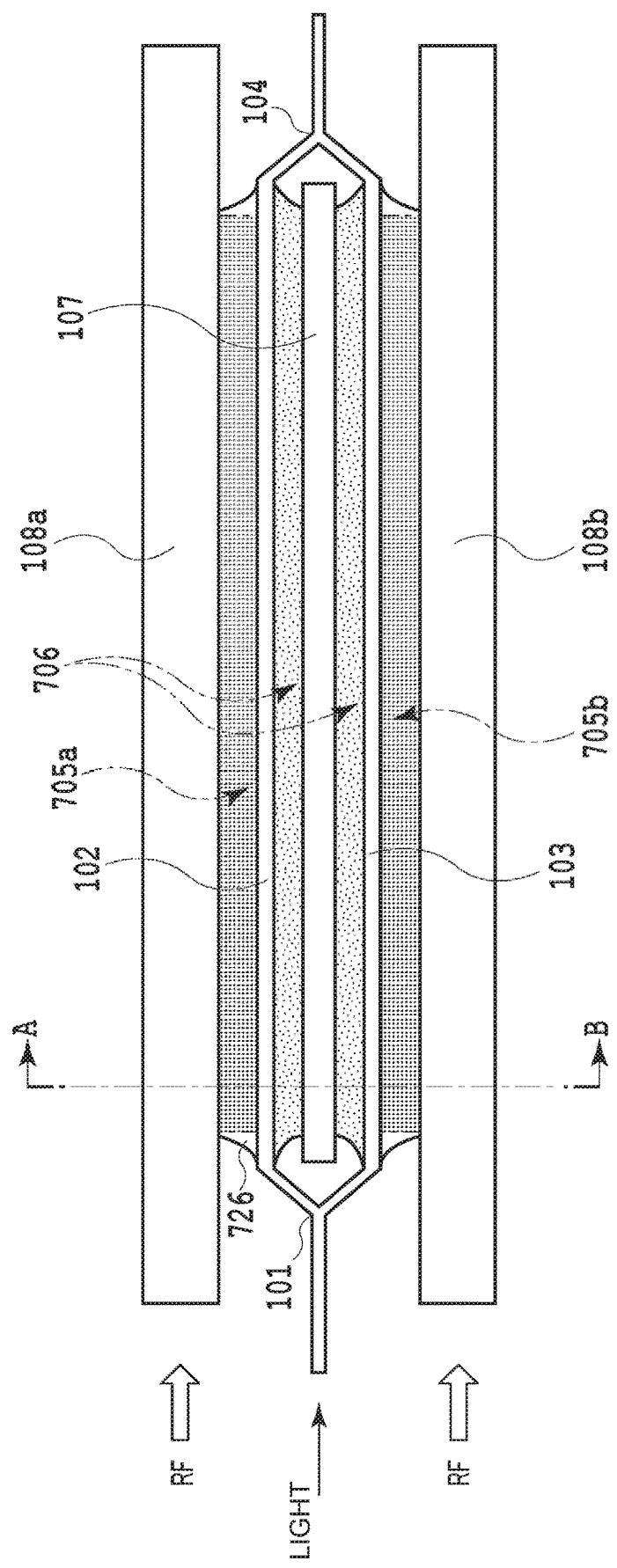
FIG. 8 is an upper view of a single electrode Mach-Zehnder optical modulator according to Embodiment 1 of the present invention.

FIG. 8 is an upper view of a single electrode Mach-Zehnder optical modulator according to Embodiment 1 of the present invention. In FIG. 8, portions identical to those of a single electrode Mach-Zehnder optical modulator as a conventional example in FIG. 3 are labeled with the same reference numerals.

The optical modulator according to Embodiment 1 of the present invention in FIG. 8 differs from the conventional example in doping patterns (planar shapes of regions) of first polarity regions 705*a* and 705*b* and a second polarity region 706 in the vicinity of a mode conversion region 726. Specifically, in Embodiment 1 of the present invention in FIG. 8, the second polarity region 706 is doped so as to be longer in the optical waveguide direction than the first polarity regions 705*a* and 705*b*. Accordingly, part or all of a portion of the mode conversion region 726 surrounded by waveguides 102 and 103 is a second polarity region.

In FIG. 9, specific examples are explained in detail which each show doping patterns of the regions 705a and 706 in a coupling region in the vicinity of mode conversion regions 726a and 726b according to Embodiment 1 of the present invention. In each drawing in FIG. 9, there is shown only a coupling region on the light input side of one optical waveguide 102 of the two optical waveguides. A coupling region of the optical waveguide 103 has a doping pattern inverted about a core 20.

Figure 9A:
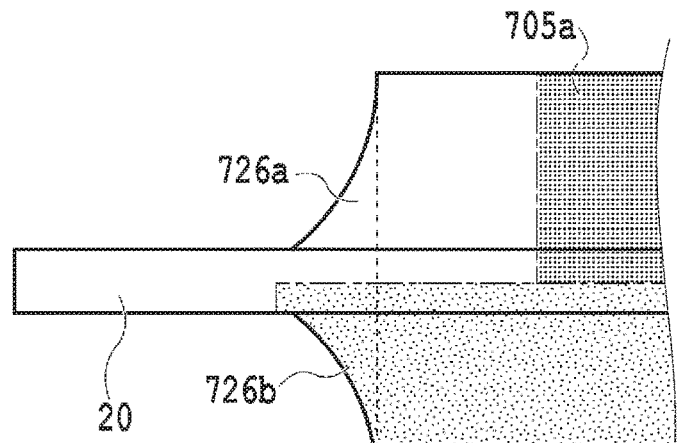
FIGS. 9(*a*), 9(*b*), and 9(*c*) are upper views of specific examples of doping patterns of coupling regions according to an embodiment of the present invention.
Figure 9B:
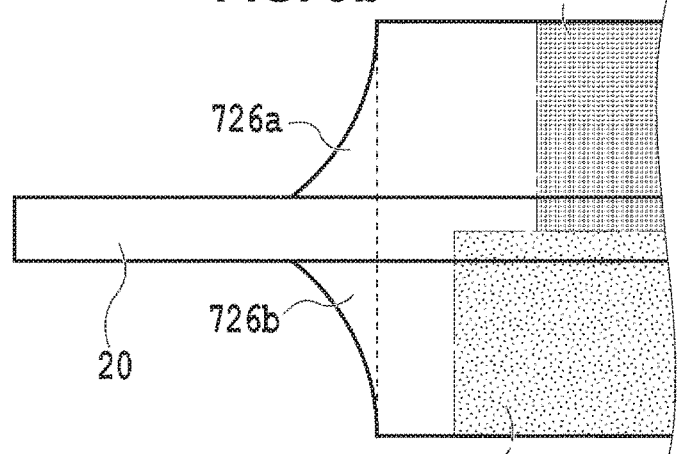

In the present invention, as in FIG. 9(a), the second polarity region 706 is doped so as to be longer in the optical waveguide direction than the first polarity regions 705a and 705b.

From the relationship of the magnitude of impurity concentration, an intrinsic semiconductor region containing no impurities typically is more affected by dopant diffusion in terms of changes in electric conductivity than a region doped to a predetermined polarity and concentration in advance. Accordingly, if such an intrinsic semiconductor region containing no impurities in the coupling region is blocked or covered with the second polarity region having the reverse polarity, the coupling region is also reverse biased, thereby reducing the influence of dopant diffusion from the first polarity region.

In FIG. 9(a), the second polarity region 706 completely covers, in the mode conversion region 726b, a portion corresponding to the inside of a semiconductor junction surface of each of the two optical waveguides. Therefore, dopant diffusion in the first polarity region 705a causes no influence, and leakage path formation is prevented.

It is best to completely cover the mode conversion region 726b with the second polarity region 706, as in FIG. 9(a). However, as in FIG. 9(b), if the second polarity region 706 does not reach the mode conversion region 726 but is slightly longer than the first polarity region 705a, the diffusion distance necessary for formation of a current leakage path becomes longer. Thus, it is more or less effective in that leakage path formation is prevented.

Figure 9C:
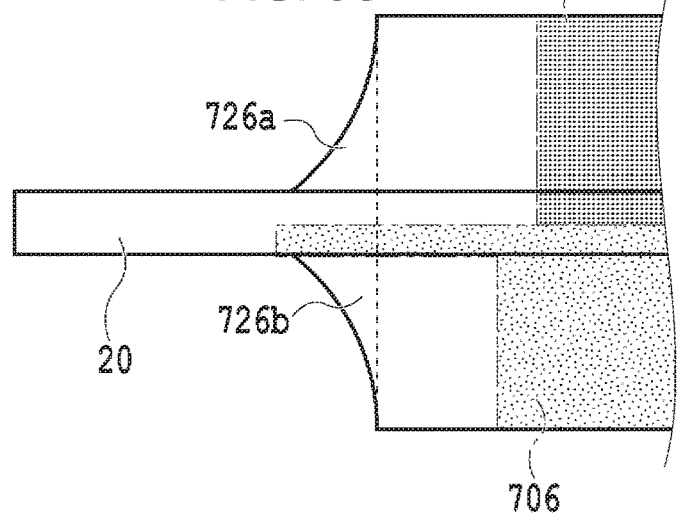

Alternatively, as in FIG. 9(c), if the second polarity region 706 blocks, in the mode conversion region 726b, the intrinsic semiconductor region over the whole of the mode conversion region 726b in the optical waveguide direction with at least part of the core width of the core 20 of the optical waveguide, the first polarity region 705a is not connected to the first polarity region 705b. Thus, it is also effective.

In this way, in Embodiment 1 of the present invention in FIG. 8, unlike the conventional example, each of the first polarity regions 705a and 705b is completely or partially separated by the second polarity region 706 located therebetween. This prevents the occurrence of a short circuit due to thermal diffusion by annealing. Therefore, defects by a process can be reduced which may occur in the conventional example, thereby improving the manufacturing yield of the optical modulator.

Furthermore, even if a case is considered in which the second polarity region 706 does not provide complete blockage between the first polarity regions 705a and 705b, the second polarity region 706 which is longer in the optical waveguide direction than the first polarity region 705a or 705b can reduce characteristic deterioration due to a leakage current between a set of two pairs of the traveling wave electrodes 108a and 108b. Therefore, defects by a process can be reduced which may occur in the conventional example, thereby improving the manufacturing yield of the optical modulator.

It should be noted that although an SOI substrate before processing may be lightly doped to the first polarity in the first place, the present invention does not depend on the doping state of the SOI substrate. That is, even if the SOI substrate is lightly doped to the first polarity, the region 706 is sufficiently doped to the reverse polarity in a manufacturing process. This can prevent the influence of diffusion from the first polarity regions 705a and 705b, and the effect of the present invention can be exhibited.

Embodiment 2

FIG. 10 is an upper view of a configuration of a Mach-Zehnder optical modulator according to Embodiment 2 of the present invention. Embodiment 2 in FIG. 10 is an embodiment in which the present invention is applied to a capacity loaded electrode Mach-Zehnder optical modulator in FIG. 5 as a conventional example. Portions identical to those of FIG. 5 are labeled with the same reference numerals, and explanations thereof are omitted.

Embodiment 2 in FIG. 10 differs from the conventional capacity loaded modulator in FIG. 5 in that a second polarity region 806 is not divided into a plurality of regions in the optical waveguide direction (continuous and integrated).

Respective ends of the optical waveguides 102 and 103 in FIG. 10 have the same doping structures in the vicinity of the mode conversion regions as those in Embodiment 1 of FIG. 8. Thus, unlike the conventional example, each of the plurality of divided first polarity regions 105a and 105b is completely separated by the second polarity region 806, including spaces between the divided portions. Accordingly, even if, for example, dopant thermal diffusion by annealing occurs, a short circuit between the set of two pairs of the traveling wave electrodes 108a and 108b can be prevented. Therefore, defects by a process can be reduced which may occur in the conventional example, thereby improving the manufacturing yield of the optical modulator.

Furthermore, the plurality of divided first polarity regions 105a and 105b have the same individual lengths and total length as those of the conventional example in FIG. 5. Thus, the loaded capacity by a pn junction per unit length of the traveling wave electrode in the light traveling direction is substantially the same as that of the conventional example in FIG. 5. Therefore, there is no difference in that impedance matching with an electronic circuit driving the optical modulator can be adjusted and high frequency characteristics can be improved, which is an advantage of the capacity loaded Mach-Zehnder optical modulator shown in the conventional example.

(Modification of Embodiment 2)

Figure 11:
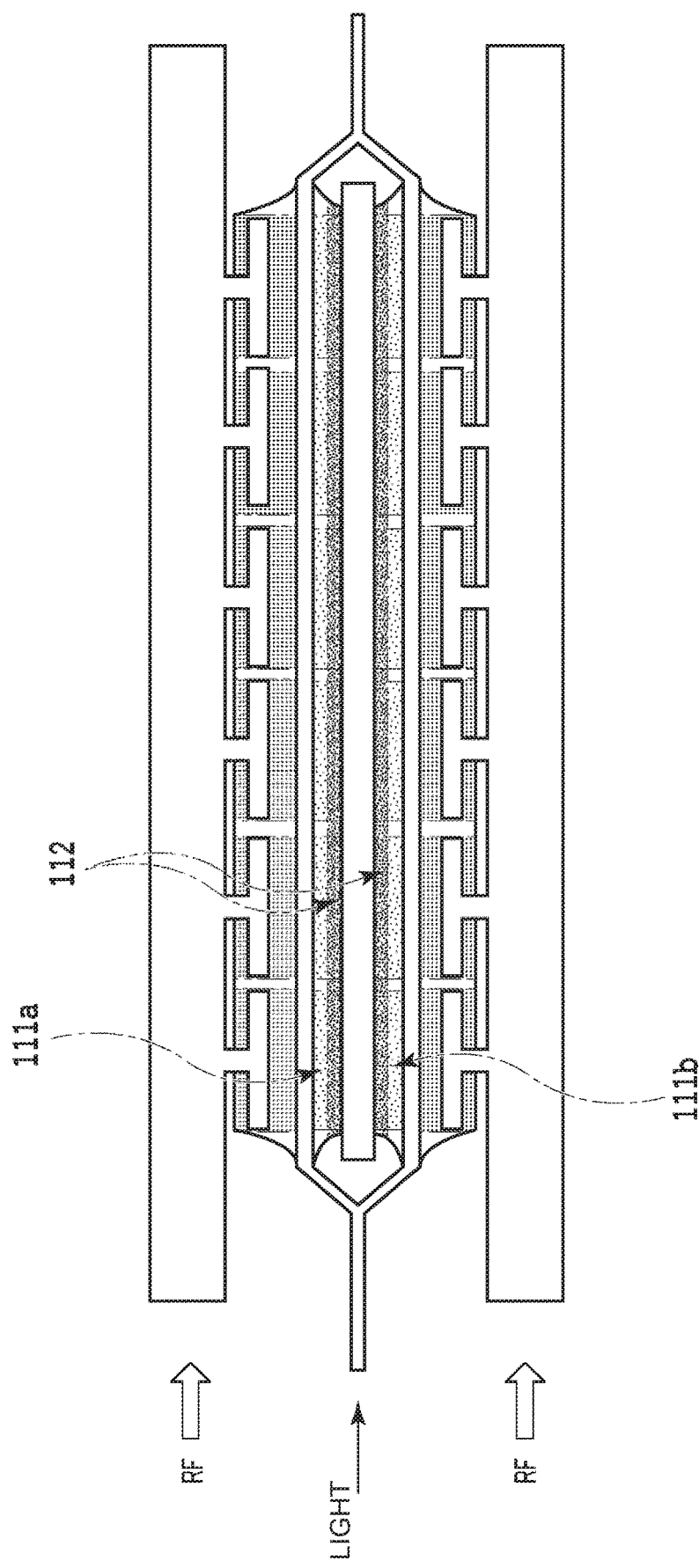
FIG. 11 is an upper view of a capacity loaded Mach-Zehnder optical modulator as a modified example according to Embodiment 2 of the present invention.

FIG. 11 is an upper view of a configuration of a Mach-Zehnder optical modulator as a modified example of Embodiment 2 of the present invention. For portions identical to those of Embodiment 2 in FIG. 10, reference numerals and explanations thereof are omitted.

In FIGS. 2 to 10, including the conventional examples, only the semiconductor polarities are focused on merely as the first and second polarity regions, and no attention is paid to the impurity concentrations. FIG. 11 differs from those drawings in that the second polarity region 806 formed between the first optical waveguide 102 and the second optical waveguide 103 in FIG. 10 is divided into lower impurity concentration second polarity partial regions 111a and 111b and a higher impurity concentration second polarity partial region 112. That is, in FIG. 11, the second polarity region is divided into the plurality of partial regions 111a, 111b, and 112 having the same polarity and different impurity concentrations in the direction perpendicular to the optical waveguide direction. The partial regions 111a and 111b may be second polarity regions having the same impurity concentration, and the impurity concentration of the second polarity partial region 112 provided therebetween is higher than those of the partial regions 111a and 111b.

In this case, the higher concentration partial region 112 is formed without being divided in the optical waveguide direction, is disposed at a position distant from the light confining region (core) of the optical waveguide, and is formed so as to be longer in length in the light traveling direction than the other regions. This provides the same effect as that of Embodiment 2, thereby improving the manufacturing yield of the optical modulator.

An optical waveguide normally has a less light loss in an undoped region than in doped one. Accordingly, a problem occurs in which, regardless of impurity concentration, extending an implantation region (a region in which implantation [ion implantation] processing is performed for doping) in the waveguide longitudinal direction somewhat increases the light loss. As in FIG. 11, the higher concentration second polarity partial region 112 is disposed at the position distant from the light confining region (core) of each of the two optical waveguides (the lower side of the bias electrode), and only this high concentration partial region 112 is extended in the waveguide longitudinal direction. Thereby, the effect of the present invention can be advantageously obtained without an increase in the light loss.

INDUSTRIAL APPLICABILITY

As described above, the optical modulator according to the present invention can improve the manufacturing yield of the optical modulator.

REFERENCE SIGNS LIST

1 SiO$_2$ clad layer
2 Si layer
3 SiO$_2$ clad layer
7 Optical waveguide
20 Core
21a, 21b Slab layer
22 High concentration p-type semiconductor layer
23 High concentration n-type semiconductor layer
24 Middle concentration p-type semiconductor layer
25 Middle concentration n-type semiconductor layer
26, 26a to 26d, 726, 726a, 726b Mode conversion region
101 Input optical coupler
102 First optical waveguide
103 Second optical waveguide
104 Output optical coupler
105a, 105b, 705a, 705b First polarity region
106, 706, 806 Second polarity region
107 Bias electrode
108a, 108b Traveling wave electrode
110a, 110b Loaded electrode
111a, 111b Lower concentration second polarity partial region
112 Higher concentration second polarity partial region

The invention claimed is:

1. An optical modulator that is a Mach-Zehnder optical modulator, comprising: an input optical coupler; a pair of first and second optical waveguides in parallel guiding an input light branched into two by the input optical coupler; and an output optical coupler coupling output lights of the first and second optical waveguides, wherein
the first and second optical waveguides have semiconductor junctions formed at boundaries between two first polarity regions and a second polarity region formed between two first polarity regions, each forming an optical phase modulation unit,
the two first polarity regions are formed outside the first and second optical waveguides,
the second polarity region is formed between the first and second optical waveguides, and
the second polarity region is longer in region length in an optical waveguide direction than the first polarity region.

2. The optical modulator according to claim 1, wherein the first polarity region is divided into a plurality of regions each along the optical waveguide direction.

3. The optical modulator according to claim 2, wherein the second polarity region includes a plurality of partial regions having an identical second polarity and having different impurity concentrations in a direction perpendicular to the optical waveguide direction.

4. The optical modulator according to claim 2, wherein the first and second optical waveguides are rib waveguides,
coupling regions of the input optical coupler with the first and second optical waveguides and coupling regions of the output optical coupler with the first and second optical waveguides are each provided with a mode conversion region, and
the mode conversion region has a shape in which a slab region expands in a fan shape toward a slab region of the rib waveguide.

5. The optical modulator according to claim 1, wherein the second polarity region includes a plurality of partial regions having an identical second polarity and having different impurity concentrations in a direction perpendicular to the optical waveguide direction.

6. The optical modulator according to claim 5, wherein of the partial regions, only a partial region having the highest impurity concentration is formed without being divided into a plurality of regions along the optical waveguide direction, is disposed at a position distant from a light confining region of the optical waveguide, and is formed so as to be longer in region length in the optical waveguide direction than other partial regions.

7. The optical modulator according to claim 6, wherein the first and second optical waveguides are rib waveguides,
coupling regions of the input optical coupler with the first and second optical waveguides and coupling regions of the output optical coupler with the first and second optical waveguides are each provided with a mode conversion region, and
the mode conversion region has a shape in which a slab region expands in a fan shape toward a slab region of the rib waveguide.

8. The optical modulator according to claim 5, wherein the first and second optical waveguides are rib waveguides,
coupling regions of the input optical coupler with the first and second optical waveguides and coupling regions of the output optical coupler with the first and second optical waveguides are each provided with a mode conversion region, and the mode conversion region has a shape in which a slab region expands in a fan shape toward a slab region of the rib waveguide.

9. The optical modulator according to claim 1, wherein the first and second optical waveguides are rib waveguides, coupling regions of the input optical coupler with the first and second optical waveguides and coupling regions of the output optical coupler with the first and second optical waveguides are each provided with a mode conversion region, and the mode conversion region has a shape in which a slab region expands in a fan shape toward a slab region of the rib waveguide.

10. The optical modulator according to claim 9, wherein the second polarity region completely covers, in the mode conversion region, a portion corresponding to an inside of a semiconductor junction surface of each of the two optical waveguides.

11. The optical modulator according to claim 9, wherein the second polarity region does not reach the mode conversion region but is longer than the first polarity region.

12. The optical modulator according to claim 9, wherein the second polarity region blocks, in the mode conversion region, an intrinsic semiconductor region over whole of the mode conversion region in the optical waveguide direction with at least part of a core width of a core of the optical waveguide.

* * * * *